(12) United States Patent
Usami et al.

(10) Patent No.: US 11,337,024 B2
(45) Date of Patent: May 17, 2022

(54) OUTPUT CONTROL DEVICE, OUTPUT CONTROL SYSTEM, AND OUTPUT CONTROL METHOD

(71) Applicant: SONY INTERACTIVE ENTERTAINMENT INC., Tokyo (JP)

(72) Inventors: Morio Usami, Tokyo (JP); Shinichi Honda, Saitama (JP)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 0 days.

(21) Appl. No.: 17/251,656

(22) PCT Filed: Jun. 21, 2018

(86) PCT No.: PCT/JP2018/023705
§ 371 (c)(1),
(2) Date: Dec. 11, 2020

(87) PCT Pub. No.: WO2019/244315
PCT Pub. Date: Dec. 26, 2019

(65) Prior Publication Data
US 2021/0258710 A1 Aug. 19, 2021

(51) Int. Cl.
*H04R 5/02* (2006.01)
*H04S 7/00* (2006.01)
*G06F 3/16* (2006.01)
*G06V 40/10* (2022.01)

(52) U.S. Cl.
CPC .............. *H04S 7/303* (2013.01); *G06F 3/165* (2013.01); *G06V 40/10* (2022.01)

(58) Field of Classification Search
CPC .......... G06F 3/165; G06V 40/10; H04S 7/303

USPC .................................................. 381/303, 306
See application file for complete search history.

(56) References Cited

U.S. PATENT DOCUMENTS

2009/0180624 A1* 7/2009 Nakayama .............. A63F 13/10
381/17

FOREIGN PATENT DOCUMENTS

| JP | 2009-58533 A | 3/2009 |
| JP | 2012-80065 A | 4/2012 |
| JP | 2017-163432 A | 9/2017 |

(Continued)

OTHER PUBLICATIONS

International Search Report and Written Opinion dated Sep. 25, 2018, from PCT/JP2018/023705, 6 sheets.

(Continued)

*Primary Examiner* — Ammar T Hamid
(74) *Attorney, Agent, or Firm* — Katten Muchin Rosenman LLP (57) ABSTRACT

A captured image obtaining unit 50 of an output control device 10 obtains a captured image such as a polarization image from an imaging device 12. A space information obtaining unit 54 obtains a normal line and a position of a surface of an actual object in a space and a sound absorption coefficient at the surface. A correction coefficient obtaining unit 56 calculates energy of sound reaching a listener including sound reflected at the actual object and obtains a correction coefficient to be given to a level of a sound signal on the basis of the sound energy. An output unit 60 adjusts the sound signals by using the correction coefficient 62 and outputs the adjusted sound signals to speakers 16a and 16b.

13 Claims, 6 Drawing Sheets

(56) References Cited

FOREIGN PATENT DOCUMENTS

WO    2016/084736 A1    6/2016
WO    2017/135194 A1    8/2017

OTHER PUBLICATIONS

Gary Atkinson and Edwin R. Hancock, "Recovery of Surface Orientation from Diffuse Polarization," IEEE Transactions on Image Processing, Jun. 2006, 15(6), pp. 1653-1664.
International Preliminary Report on Patentability dated Dec. 30, 2020, from PCT/JP2018/023705, 12 sheets.

* cited by examiner

OUTPUT CONTROL DEVICE, OUTPUT CONTROL SYSTEM, AND OUTPUT CONTROL METHOD

TECHNICAL FIELD

The present invention relates to an output control device, an output control system, and an output control method that control output of a substance that propagates in a space.

BACKGROUND ART

In recent years, as a result of progress of an acoustic technique, a surround system has widely been used. In the surround system, realistic feeling is provided by reproducing, for example, music that is recorded in multi-channels or sound of a moving image, with use of a plurality of speakers. In addition, there is proposed a technique in which sound having directivity is caused to be reflected on a plane in a room to create a feeling as if the sound is generated from the plane, for enhancing realistic feeling of content such as games or virtual reality (e.g., refer to PTL 1).

CITATION LIST

Patent Literature

[PTL 1]
WO 2016/084736 A1

SUMMARY

Technical Problems

In general, in order to enable listening of sound that offers realistic feeling with high quality, various kinds of means are used in, for example, the number and arrangement of speakers or for achieving a balance between sound volumes and frequency bands of the speakers. Meanwhile, sounds listened by a listener includes sounds reflected at surfaces of actual objects such as walls or furniture present near the listener, in addition to direct sounds from the speakers. Therefore, it is possible that sound is listened in a different manner or realistic feeling is deteriorated depending on a listening environment.

Figure 1:
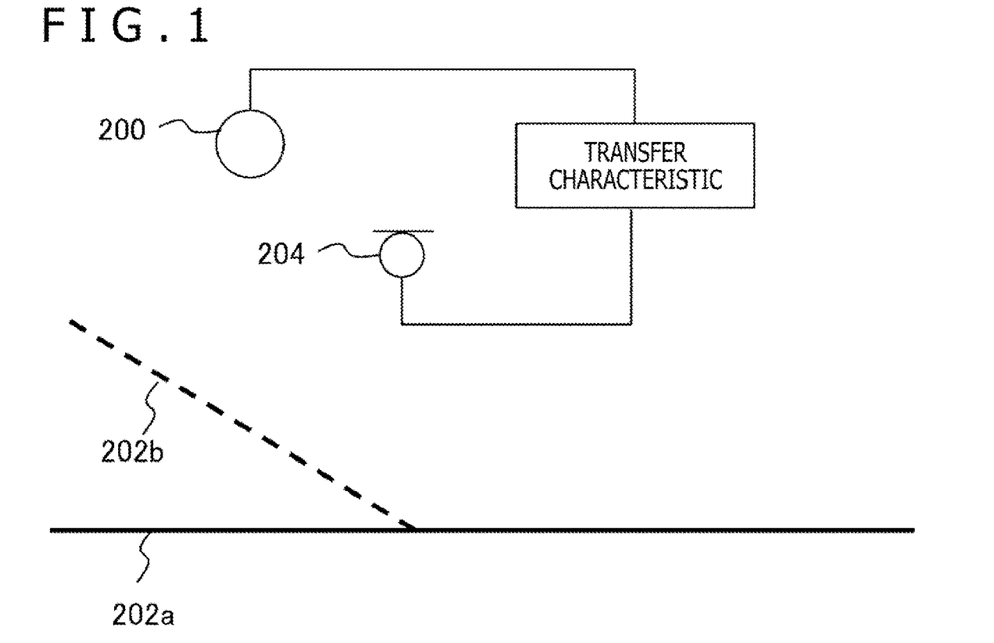
FIG. 1 is a diagram for explaining a change in sound characteristics when reflection from walls is taken into account.

FIG. 1 is a diagram for explaining a change in sound characteristics when reflection from walls is taken into account. FIG. 1 schematically illustrates a state in which a sound source 200 and two walls 202a and 202b are overlooked. Even if the same sound is emitted from the sound source 200, a waveform of the sound at a sound receiving point 204 is different due to a difference between the wall 202a and the wall 202b. Specifically, with the wall present closer to the sound source 200 or the sound receiving point 204 as the wall 202b, amplitude of the reflected sound becomes larger and a time difference between the direct sound and the reflected sound becomes smaller.

Such a difference in waveform is represented as a difference in sound volume that is noticed by humans. Therefore, for example, it is possible to optimize the sound from the sound source 200 in such a manner that a microphone is disposed near the sound receiving point 204 and an impulse response is measured to obtain a sound transfer characteristic. However, in this case, relatively large-scale calibration using the microphone is required, which is not suitable for each user to perform in, for example, his or her own room.

In addition, performance of such calibration every time furniture and the like are moved requires much labor.

With not only the sound, but also a substance that propagates in a space, such as air sent from an air conditioner or light emitted from an illuminating lamp, a degree of comfort felt by a person staying in the space can often be deteriorated by reflection at surrounding objects in a similar manner. Also with respect to those substances, it is not easy to measure the degree of comfort by any method every time states of the surrounding objects are changed and to adjust an output amount or an output mode according to the measured result.

The present invention has been made in view of such problems, and an object thereof is to provide a technique capable of maintaining a substance that propagates in a space such as sound, in a preferable state even when a surrounding state changes.

Solution to Problems

One aspect of the present invention relates to an output control device. This output control device is an output control device that controls output of sound and includes a space information obtaining unit that obtains a position and a normal line of an actual object in a space on the basis of a captured image, a correction coefficient obtaining unit that calculates a ratio of a change of a parameter representing a state of the sound at a predetermined position, the change being caused by reflection at the actual object, on the basis of the position and the normal line, and obtains a correction coefficient for adjusting the output of the sound on the basis of the ratio of the change, and an output unit that adjusts the output of the sound by using the correction coefficient.

Another aspect of the present invention relates to an output control system. This output control system includes an imaging device that captures an image of a space and an output control device that controls output of sound. In the output control system, the output control device includes a space information obtaining unit that obtains a position and a normal line of an actual object in the space on the basis of an image captured by the imaging device, a correction coefficient obtaining unit that calculates a ratio of a change of a parameter representing a state of the sound at a predetermined position, the change being caused by reflection at the actual object, on the basis of the position and the normal line, and obtains a correction coefficient for adjusting the output of the sound, on the basis of the ratio of the change, and an output unit that adjusts the output of the sound by using the correction coefficient.

Yet another aspect of the present invention relates to an output control method. In this output control method, an output control device that controls output of sound includes a step of obtaining an image captured by an imaging device, a step of obtaining a position and a normal line of an actual object in a space on the basis of the captured image, a step of calculating a ratio of a change of a parameter representing a state of the sound at a predetermined position, the change being caused by reflection at the actual object, on the basis of the position and the normal line, and obtaining a correction coefficient for adjusting the output of the sound, on the basis of the ratio of the change, and a step of adjusting the output of the sound by using the correction coefficient.

Still another aspect of the present invention relates to an output control device. This output control device is an output control device that controls output of a propagation substance that propagates in a space, and includes a space information obtaining unit that obtains a position and a normal line of an actual object in the space on the basis of a captured image, a correction coefficient obtaining unit that calculates a ratio of a change of a parameter representing a state of the propagation substance at a predetermined position, the change being caused by reflection at the actual object, on the basis of the position and the normal line, and obtains a correction coefficient for adjusting the output of the propagation substance, on the basis of the ratio of the change, and an output unit that adjusts the output of the propagation substance by using the correction coefficient.

Here, the kind of the "propagation substance" is not limited, as long as the substance propagates in a space, such as sound, air, light, smoke, smell, and liquid. The "propagation substance" may be "fluid." Accordingly, the "output control device" may be any one of a device itself that generates any of those substances in a space, a device connected to the device, a device incorporated in those devices, or the like. For example, the "output control device" may be incorporated in a music reproducing device, a moving-picture reproducing device, an amplifier, a speaker, an air conditioner, an air blower, an illumination device, a smoking device, an aroma diffuser, a chiller, and the like, or may be connected to one of them.

Further, the "parameter representing the state" and the "output" to be adjusted may also be various depending on the propagation substance and a control mechanism. For example, the "parameter" may be any of energy, a sound volume, illuminance, a flow rate, a flow speed, pressure, and the like of the propagation substance. The "output" may be any of a signal level, a voltage, a current, pressure, a flow rate, a discharge amount, and the like.

Note that any combinations of the above components and aspects in which expression of the present invention is converted between a method, a device, and the like are also effective as aspects of the present invention.

Advantageous Effect of Invention

According to the present invention, a substance that propagates in a space can be maintained in a preferable state even when a surrounding state changes.

DESCRIPTION OF EMBODIMENT

The present exemplary embodiment does not limit the kind of a control target, as long as the control target is a substance that propagates in a space, for example, sound, air, or light. Hereinafter, an output control device and an output control system, which control sound output, will be described as typical examples.

Figure 2:
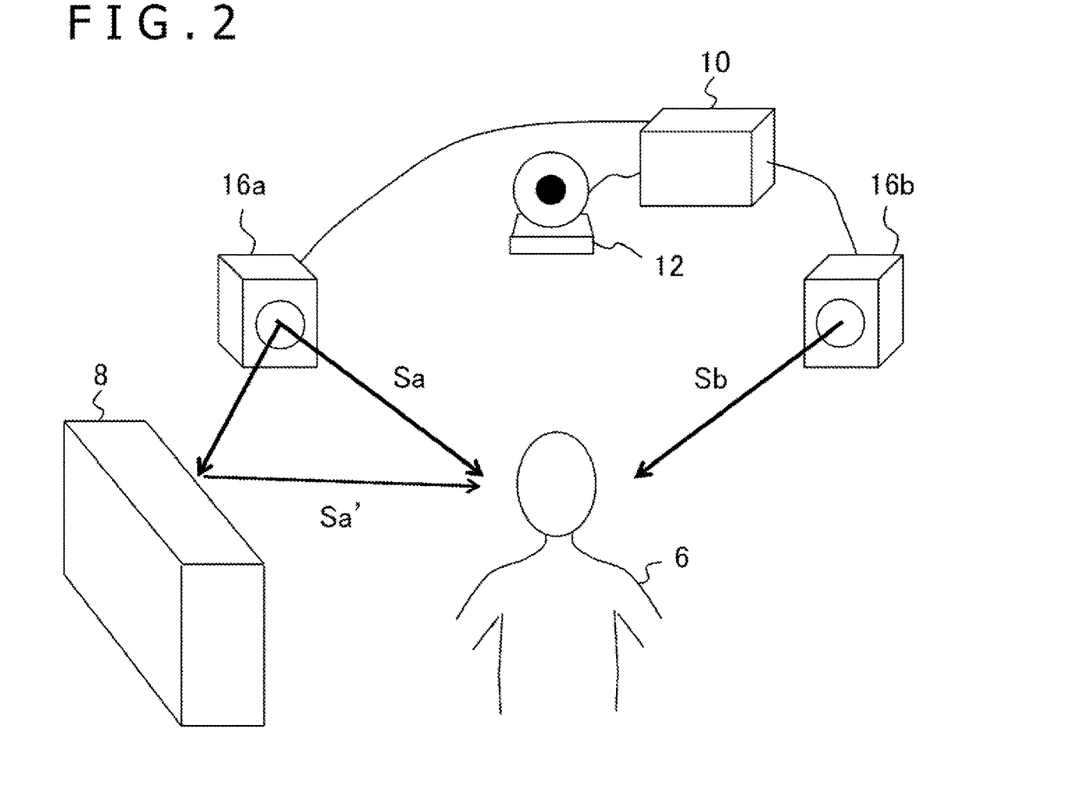
FIG. 2 is a diagram illustrating a configuration example of a sound control system of the present exemplary embodiment.

FIG. 2 illustrates a configuration example of the output control system of the present exemplary embodiment. This output control system includes an imaging device 12 that captures an image of a space including, for example, a listener 6 and furniture 8, an output control device 10 that controls sound output, and speakers 16a and 16b each of which outputs sound. The output control system may further include an input device that receives an operation with respect to the output control device 10 from a user. The output control system 10 may further be communicable with an external device such as a server by being connected to a network such as the Internet.

The output control device 10, the imaging device 12, and the speakers 16a and 16b may be connected to each other through a wired cable, or may be wirelessly connected to each other through, for example, a wireless LAN (Local Area Network). Alternatively, by combining, for example, the output control device 10 and the imaging device 12, or the imaging device 12 and the speakers 16a and 16b, an integrated device may be configured. In any case, external appearance shapes of the output control device 10, the imaging device 12, and the speakers 16a and 16b are not limited to the illustration. Further, the speakers are not limited to be two.

The imaging device 12 captures an image of a listening space including, for example, the listener 6 and the furniture 8. Note that the furniture 8 is merely an example of an actual object present in the space and is not essential for the present exemplary embodiment. Further, a shape, a size, a position, or a posture of the actual object is not intended to be limited. The actual object may be a wall or a ceiling of a room, for example, or may be a tree or an external wall of a building in the case of outdoor. In addition, the listener 6 is not limited to be one.

The output control device 10 reproduces sound data such as music selected by the listener 6 and causes the reproduced sound data to be output from the speakers 16a and 16b. At this time, the output control device 10 identifies the position and the posture of the actual object present in the space such as the furniture 8, in addition to the listener 8, by using the image captured by the imaging device 12. The output control device 10 adjusts sound volumes of the speakers 16a and 16b taking sound reflected at a surface of the actual object into account.

In the illustrated example, sound that reaches the listener 6 from the right speaker 16b is only direct sound Sb, whereas sound that reaches the listener 6 from the left speaker 16a includes direct sound Sa and reflected sound Sa' from the furniture 8. If left sound and right sound are intended to be listened at the same sound volume, the sound volume of the speaker 16a may be decreased, or the sound volume of the speaker 16b may be increased. Accordingly, using, as a reference, a case including only the direct sound Sa, for example, the output control device 10 estimates an increase ratio of a sound volume to be recognized by the listener 6 in sound Sa+Sa' including the reflected sound, to adjust a set sound volume of the speaker 16a or the speaker 16b.

Note that the reference is not limited to the case including the direct sound alone, and may be sound including reflected sound from, for example, a wall in a standard environment with no furniture 8 or the like. In any case, the set sound volume is adjusted on the basis of an increase or decrease ratio of the sound volume caused by a change in the number, the positions, or the postures of the actual objects from a reference state, thereby allowing the sound to be similarly listened regardless of such a change. Note that the output control device 10 may have a function of processing various kinds of content such as an electrical game or a moving picture other than the function of controlling the sound to be output. Alternatively, the output control device 10 may be a part of a device that performs such various kinds of information processing.

Accordingly, the kind of the "sound" to be controlled by the output control device 10 is not limited, as long as it is sound such as music, effect sound, or a voice of humans or animals. Further, the output control system may include a display device that displays an image of the content. The image captured by the imaging device 12 may be used to generate such a display image. Each of the speakers 16a and 16b outputs an electric signal of the sound output by the output control device 10, as a sound wave. Each of the speakers 16a and 16b may be a typical speaker such as an active speaker incorporating an amplifier that amplifies an electric signal or a passive speaker without an amplifier.

Figure 3:
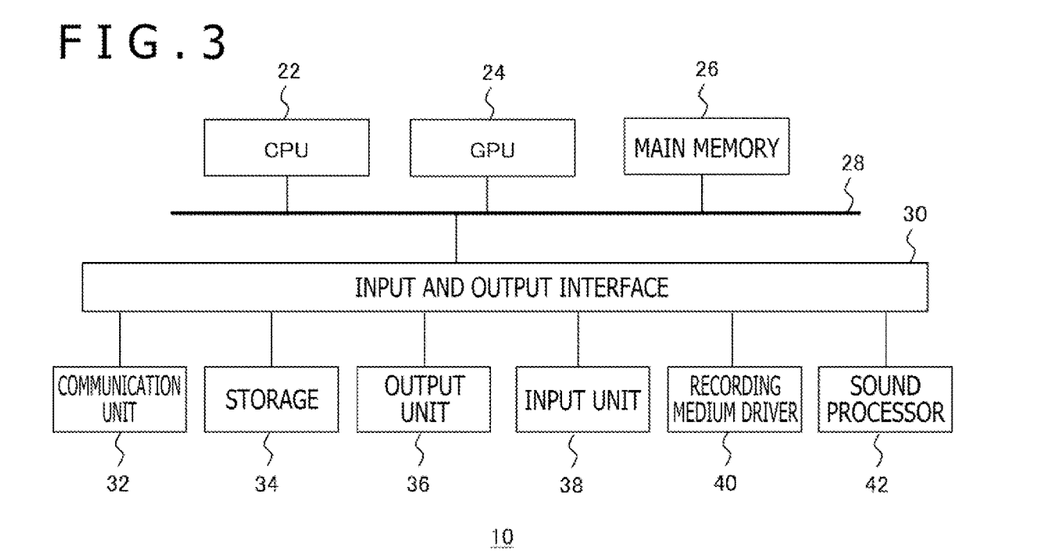
FIG. 3 is a diagram illustrating an internal circuit configuration of an output control device of the present exemplary embodiment.

FIG. 3 illustrates an internal circuit configuration of the output control device 10. The output control device 10 includes a CPU (Central Processing Unit) 22, a GPU (Graphics Processing Unit) 24, and a main memory 26. Those portions are connected to each other through a bus 28. The bus 28 is further connected with an input and output interface 30. The input and output interface 30 is connected with a peripheral apparatus interface such as a USB (Universal Serial Bus) or IEEE (Institute of Electrical and Electronics Engineers) 1394, a communication unit 32 including a network interface of a wired or wireless LAN, a storage 34 such as a hard disk drive or a nonvolatile memory, an output unit 36 that outputs data to, for example, an unillustrated display device, an input unit 38 that receives data from the imaging device 12 or an unillustrated input device, a recording medium driver 40 that drives a removable recording medium such as a magnetic disk, an optical disk, or a semiconductor memory, and a sound processor 42 that processes sound signals to be transmitted to the speakers 16a and 16b.

The CPU 22 executes an operating system stored in the storage 34, to entirely control the output control device 10. The CPU 22 also executes various programs that are read out from the removable recording medium and are loaded on the main memory 26 or that are downloaded through the communication unit 32. The GPU 24 performs various kinds of image processing according to a request from the CPU 22. The main memory 26 includes a RAM (Random Access Memory) and stores programs and data necessary for the processing. The sound processor 42 generates an electric signal of sound and outputs the electric signal to each of the speakers 16a and 16b, according to a request from the CPU 22.

Figure 4:
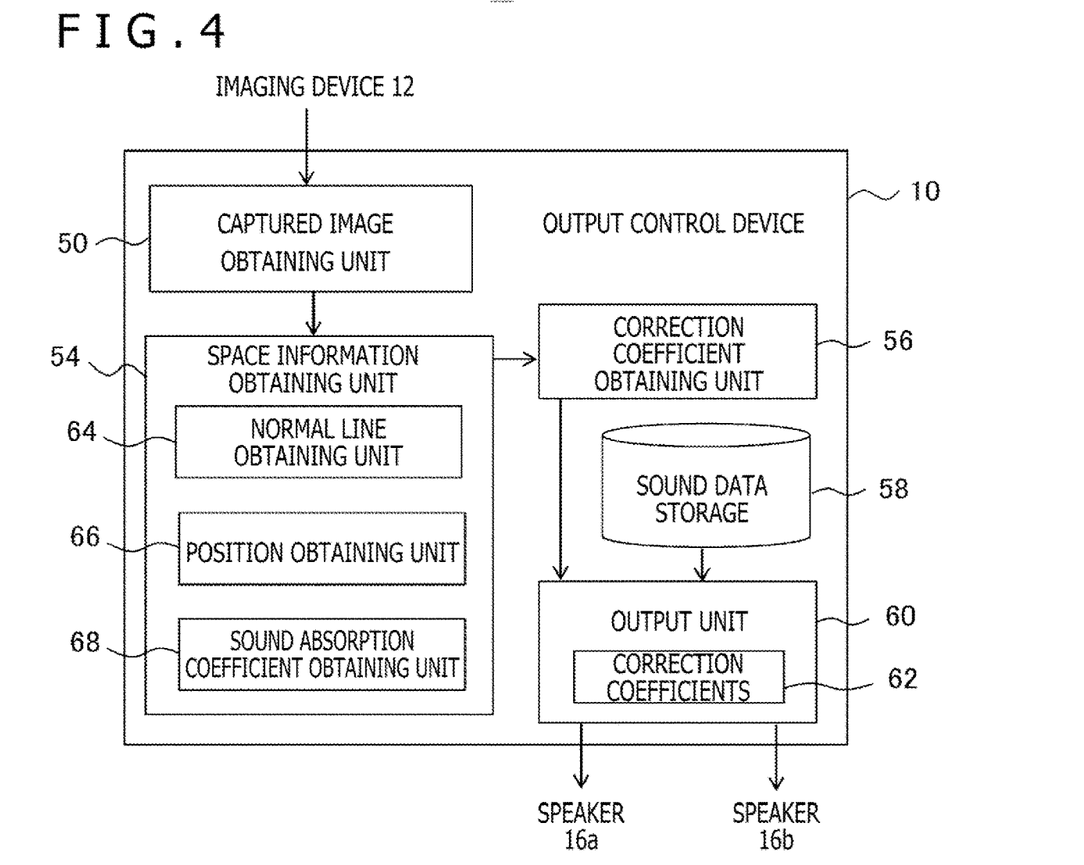
FIG. 4 is a diagram illustrating a configuration of functional blocks of the output control device of the present exemplary embodiment.

FIG. 4 illustrates a configuration of functional blocks of the output control device 10. The functional blocks illustrated in FIG. 4 can be implemented with the configuration of, for example, the CPU, the GPU, the various memories, and the data bus illustrated in FIG. 3 in terms of hardware and are implemented with the programs that achieve various functions such as a data input function, a data retaining function, a calculation function, an image processing function, and a sound processing function, the program being loaded from, for example, the recording medium to the memory, in terms of software. Accordingly, persons skilled in the art understand that those functional blocks are implemented in various forms by only hardware, only software, or a combination of hardware and software, and the implementation is not limited to either hardware or software.

The output control device 10 includes a captured image obtaining unit 50 that obtains data of a captured image from the imaging device 12, a space information obtaining unit 54 that obtains information regarding an actual object such as a listener or furniture by using the captured image, a correction coefficient obtaining unit 56 that adjusts a sound volume by taking reflection at the actual object into account, a sound data storage 58 that stores sound data to be reproduced, and an output unit 60 that outputs an electric signal of sound to each of the speakers 16a and 16b.

The captured image obtaining unit 50 is implemented with, for example, the input unit 38 and the CPU 22 in FIG. 3 and obtains data of the captured image from the imaging device 12. As described above, in the present exemplary embodiment, sound reflected at a surface of the actual object is taken into account in order to normalize sound that reaches the listener 8. Therefore, the captured image obtaining unit 50 obtains a captured image from which the position and the posture of the actual object can be obtained. For example, when the imaging device 12 that is a polarized light camera obtains polarization images in a plurality of orientations, a normal line of a surface of a subject can be obtained. In this case, as described later, the imaging device 12 having a structure in which a polarizer layer is provided on a typical element structure such as a CMOS (Complementary Metal Oxide Semiconductor) image sensor can be used.

Alternatively, a polarization plate capable of changing a principal axis angle may be provided on a front surface of a lens of a typical natural-light camera prepared as the imaging device 12. On the other hand, the imaging device 12 is made to be a multiple-lens camera, and the captured image obtaining unit 50 obtains pieces of image data captured from different viewing points, whereby a position of the subject in a three-dimensional space can be obtained. In this case, a polarized light camera may be used as at least one of the multiple-lens camera, and captured images from the multiple viewing points including the polarization image may be obtained.

While one polarized light camera prepared as the imaging device 12 is moved, pieces of image data captured from a plurality of viewing points may sequentially be obtained. Alternatively, as a part of the imaging device 12, a sensor system that irradiates a space with reference light such as infrared light and detects its reflected light may be introduced. In this case, the captured image obtaining unit 50 may obtain depth image data that represents distances to a subject on an image plane, the image data being obtained inside the imaging device 12. A method for detecting a distance to a subject on the basis of a time period from the irradiation with the reference light to the detection of the reflected light is known as TOF (Time Of Flight).

The space information obtaining unit 54 is implemented with, for example, the CPU 22 and the GPU 24 and obtains information regarding the actual object present in the space by using the data of the captured image. More specifically, the space information obtaining unit 54 includes a normal line obtaining unit 64 that obtains a normal line of a surface of an actual object, a position obtaining unit 66 that obtains a position of the actual object in a three-dimensional space, and a sound absorption coefficient obtaining unit 68 that obtains a sound absorption coefficient of the actual object.

Various methods are possible for calculating the normal line and the three-dimensional position of the actual object depending on the kind of the captured image to be obtained. As a typical example, the normal line obtaining unit 64 obtains the normal line by using the polarization images in the plurality of orientations as described above. There is generally known a technique that, by using a fact that behavior of polarization strength with respect to the orientation depends on a reflection angle of light from a subject, a normal line of the surface of the subject is calculated on the basis of a change in luminance of a polarization image with respect to a change in an angle of a polarizer. Further, for example, the position obtaining unit 66 calculates a distance from an imaging surface to an actual object by using stereo images captured from two viewing points in which a distance between them is known, and obtains a position of a surface of the actual object by transforming the calculated distance into positional coordinates in a three-dimensional space.

There is also generally known a method that calculates a distance to an object from a triangulation principle on the basis of parallax of an image of the same object in stereo images. In a case where polarization images captured from a plurality of viewing points can be obtained, since the normal line obtaining unit 64 can obtain the same normal line in each camera coordinate system, a distance to a surface of an actual object from which the normal line is obtained can be obtained on the basis of a positional relation between the viewing points. In any case, for capturing an image from the plurality of viewing points, a multiple-lens camera or a single camera whose viewing point is movable may be used.

Note that in a case where the imaging device 12 generates a depth image based on the TOF, the position obtaining unit 66 can calculate positional coordinates in a three-dimensional space from coordinate transformation by using the depth image obtained by the captured image obtaining unit 50. Further, the normal line obtaining unit 64 may calculate the normal line on the basis of a distribution of positions of the surface of the object, which are obtained by the position obtaining unit 66. Alternatively, the position obtaining unit 66 may interpolate distances to the actual object calculated in a discrete manner, by using a normal-line distribution calculated by the normal line obtaining unit 64. As described above, the normal line obtaining unit 64 and the position obtaining unit 66 may mutually and complementarily use information that is obtained by the two units. In any case, the position and the posture of the actual object in the three-dimensional space can be calculated through the functions of the normal line obtaining unit 64 and the position obtaining unit 66.

As long as the sound absorption coefficient obtaining unit 68 can finally estimate a sound absorption coefficient of the actual object, the kind of information used as a basis of the estimation is not limited. For example, materials such as metal, wood, plastic, and cloth are estimated on the basis of a color, intensity, and a polarization degree of the captured image, and then, sound absorption coefficients of the materials are identified. Particularly, a method that estimates the material from a ratio of reflection components such as diffuse reflection and specular reflection with use of the polarization image has conventionally been researched. In a case where the polarization image is analyzed to calculate the normal line of the surface of the actual object in the present exemplary embodiment, its analyzed result can also be used for the material estimation. For each material assumed to be the actual object, the sound absorption coefficient obtaining unit 68 internally holds a database in which parameters such as the color and the polarization degree obtained from a captured image of the material are associated with the sound absorption coefficient, and obtains the sound absorption coefficient on the basis of values of parameters that are separately obtained.

Alternatively, the sound absorption coefficient obtaining unit 68 may obtain the sound absorption coefficient from information other than the captured image. For example, an unillustrated display device is caused to display an image of the actual object identified by the normal line obtaining unit 64 or the position obtaining unit 66, and the listener may input the material. Also in this case, the sound absorption coefficient is obtained by referring to the database. Note that a default value may be used as the sound absorption coefficient, and in such a case, the processing of the sound absorption coefficient obtaining unit 68 can be omitted.

The correction coefficient obtaining unit 56 is implemented with, for example, the CPU 22 and the main memory 26 and calculates energy or pressure of the sound that reaches the listener including a reflected sound, on the basis of the position and the posture of the surface of the actual object, and determines the correction coefficient of a sound signal to be output to each of the speakers 16a and 16b. Qualitatively, as explained in FIG. 2, in a case where a-times energy arrives due to the reflected sound relative to a reference state, the correction coefficient for a signal level is determined to be 1/a. The determined correction coefficient is informed to the output unit 60.

Note that in a case where a plurality of speakers are used, the correction coefficient may be determined for each speaker in terms of balance as described above. For example, it can be considered that, in a case where sound from a certain speaker is caused to have a-times energy by reflected sound, sound from other speakers is also caused to have a-times energy for achieving a balance. When this approach is generalized, in a case where sounds from speakers are caused to respectively have a-, b-, c-, . . . times energy, correction coefficients of the speakers may respectively be set as T/a, T/b, T/c, . . . , where a least common multiple of a, b, c, . . . is T.

The output unit 60 is implemented with the sound processor 42, reproduces data determined by, for example, a user operation among pieces of sound data stored in the sound data storage 58, and outputs its electric signals to the speakers 16a and 16b. Here, the output unit 60 internally holds a correction coefficient 62 determined by the correction coefficient obtaining unit 56 and multiplies the electric signals by the correction coefficient 62 to adjust a signal level to be output to each of the speakers 16a and 16b. In a case where the number, the positions, and the postures of the actual objects are fixed in the space, when the correction coefficient obtaining unit 56 once obtains the correction coefficient, the output unit 60 can maintain an appropriate state thereafter by using it.

In a case where the number, the positions, and the postures of the actual objects are variable such as an increase or decrease in persons, the correction coefficient obtaining unit 56 may perform the processing at, for example, predetermined intervals to update the correction coefficient. When the output unit 60 uses the appropriately updated correction coefficient to adjust the signal level, even if a change in a state occurs in an actual space in the middle of music, for example, a change in the listening state can be suppressed. Note that the adjustment function of the signal level using the correction coefficient may be provided in each of the speakers 16a and 16b.

In this case, the output unit 60 outputs the electric signal and the correction coefficient of the sound to each of the speakers 16a and 16b. As a matter of course, the signal level, that is, the sound volume, may be adjusted by the user with an unillustrated input device. Irrespective of whether the user operation or the automatic adjustment in which the reflected sound is taken into account is performed, a circuit configuration mounted on a typical audio device can be applied to the sound volume adjustment, and thus, a specific description is omitted. Note that the sound data to be processed by the output unit 60 is not limited to data stored in the sound data storage 58 and may be, for example, stream data obtained from a server through a network.

Figure 5:
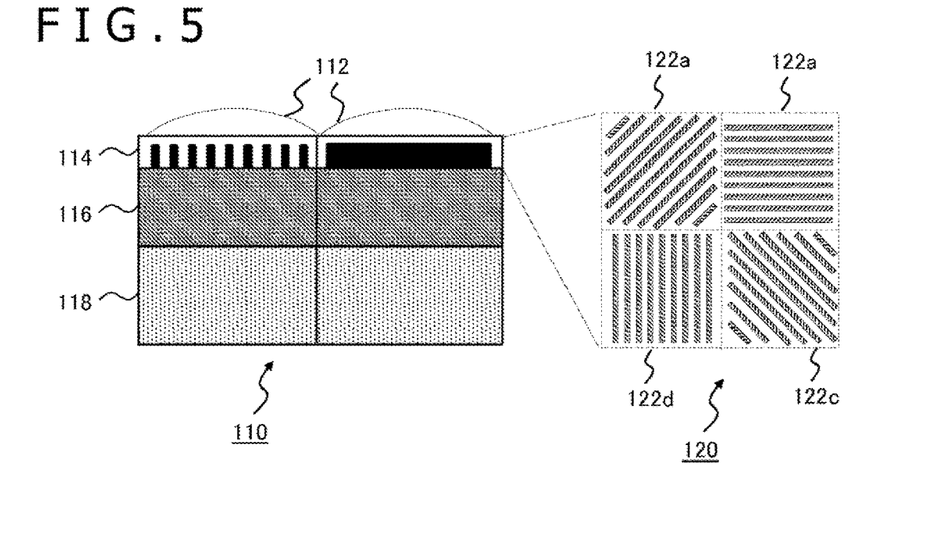
FIG. 5 is a diagram illustrating a structure example of an imaging element that can be introduced in an imaging device of the present exemplary embodiment.

FIG. 5 illustrates a structure example of an imaging element that can be introduced to the imaging device 12 of the present exemplary embodiment. Note that FIG. 5 schematically illustrates a functional structure of a section of the element and omits a detailed structure such as an interlayer insulation film or wiring. The imaging element 110 includes a micro-lens layer 112, a wire-grid type polarizer layer 114, a color filter layer 116, and a light detection layer 118. The wire-grid type polarizer layer 114 includes a polarizer in which a plurality of wire type conductive members are arranged in a stripe manner at intervals each of which is smaller than a wavelength of incident light. When light collected by the micro-lens layer 112 enters the wire-grid type polarizer layer 114, a polarized component in an orientation parallel to lines in the polarizer is reflected, and only a polarized component vertical to the lines is transmitted.

The light detection layer 118 detects the transmitted polarized component to obtain the polarization image. The light detection layer 118 has a typical semiconductor element structure such as a CCD (Charge Coupled Device) image sensor or a CMOS image sensor. The wire-grid type polarizer layer 114 includes an arrangement of polarizers whose primary axis angles are different in a read unit of charges in the light detection layer 118, that is, a pixel unit, or in a unit larger than the pixel unit. On the right side of FIG. 5, illustrated is a polarizer arrangement 120 when the wire-grid type polarizer layer 114 is viewed from above.

In FIG. 5, hatched lines are conductors (wires) configuring the polarizer. Note that each of rectangles of dotted lines represents a region of a polarizer of one primary axis angle, and the dotted lines themselves are not actually formed. In the illustrated example, polarizers of four primary axis angles are respectively disposed in four regions 122a, 122b, 122c, and 122d in two rows and two columns. In FIG. 5, primary axis angles of polarizers present on each of diagonal lines are orthogonal to each other, and a difference between adjacent polarizers is 45°. In other words, polarizers of four primary axis angles each of which has the difference of 45° are provided.

Each polarizer transmits a polarized component in a direction orthogonal to a wire direction. This allows respective regions corresponding to the four regions 122a, 122b, 122c, and 122d to obtain polarization information regarding four orientations for every 45° in the light detection layer 118 provided below. The arrangements of the polarizers of such four primary axis angles are further arranged in a predetermined number in vertical and horizontal directions, and a peripheral circuit that controls timing of charge reading is connected to the arrangement. This achieves an image sensor that simultaneously obtains four kinds of polarization information as two-dimensional data.

In the imaging element 110 illustrated in FIG. 5, the color filter layer 116 is provided between the wire-grid type polarizer layer 114 and the light detection layer 118. The color filter layer 116 includes an arrangement of filters that respectively transmit light of red, green, and blue corresponding to respective pixels, for example. With this configuration, the polarization information can be obtained for each color according to a combination of the primary axis angle of the polarizer in the wire-grid type polarizer layer 114 positioned above and the color of the filter in the color filter layer 116 positioned below. In other words, the polarization information regarding the same orientation and the same color is discretely obtained on the image plane. Therefore, when the information is appropriately interpolated, the polarization image can be obtained for each orientation and for each color.

In addition, by calculating the polarization images of the same color, a color image with no polarization can also be reproduced. For example, Japanese Patent Laid-open No. 2012-80065 discloses an image obtaining technique using the wire-grid type polarizer. However, the element structure of the imaging device 12 in the present exemplary embodiment is not limited to the illustration. For example, in the present exemplary embodiment, the state information regarding the actual object can be obtained using polarized light intensity image. Therefore, when the color image is not needed in another application, the color filter layer 116 can be omitted. Further, the polarizer is not limited to the wire-grid type and may be of any types that are in a practical use, such as a linear dichroism polarizer.

Research of the technique for obtaining various pieces of information regarding a subject by using the polarization image has conventionally been conducted. A method for calculating a normal line vector of a surface of a subject is also disclosed in, for example, Gary Atkinson and Edwin R. Hancock, "Recovery of Surface Orientation from Diffuse Polarization," IEEE Transactions on Image Processing, June 2006, 15(6), pp. 1653-1664 and Japanese Patent Laid-open No. 2009-58533. The present exemplary embodiment may employ such method. Hereinafter, an outline will be described.

First, intensity of light, which is observed through a polarizer, changes as represented in the following expression with respect to a primary axis angle $\theta_{pol}$ of the polarizer.

[Math. 1]

$$I = \frac{I_{max} + I_{min}}{2} + \frac{I_{max} - I_{min}}{2}\cos(2(\theta_{pol} - \phi)) \quad \text{(Expression 1)}$$

Here, $I_{max}$ and $I_{min}$ are respectively a maximum value and a minimum value of the observed intensity, and $\phi$ is a polarization phase. As described above, in the case where the polarization images are obtained for four primary axis angles $\theta_{pol}$, intensity I of pixels located at the same position satisfies Expression 1 with respect to each primary axis angle $\theta_{pol}$. Accordingly, a curve passing through the coordinates (I, $\theta_{pol}$) is approximated to a cosine function by using, for example, a least squares method, whereby $I_{max}$, $I_{mine}$ and φ can be calculated. The polarization degree p can be calculated according to the following expression by using $I_{max}$ and $I_{min}$ thus calculated.

[Math. 2]

$$\rho = \frac{I_{max} - I_{min}}{I_{max} + I_{min}} \quad \text{(Expression 2)}$$

A normal line of a surface of a target object can be represented with an orientation angle α representing an angle of an incident surface of light (in a case of diffused reflection, an emission surface) and a zenith angle θ representing an angle on this surface. Further, according to a dichroism reflection model, a spectrum of reflected light is represented by a linear sum of a spectrum of specular reflection and a spectrum of diffused reflection. Here, the specular reflection includes light that is specularly reflected on a surface of an object, and the diffused reflection includes light diffused by pigment particles configuring an object. The above-described orientation angle α is a primary axis angle that provides the minimum intensity $I_{min}$ in Expression 1 in a case of the specular reflection and is a primary axis angle that provides the maximum intensity $I_{max}$ in Expression 1 in a case of the diffused reflection.

The zenith angle θ has the following relations respectively with the polarization degree $\rho_s$ in the case of the specular reflection and the polarization degree $\rho_d$ in the case of the diffused reflection.

[Math. 3]

$$\rho_s = \frac{2\sin^2\theta\cos\theta\sqrt{n^2 - \sin^2\theta}}{n^2 - \sin^2\theta - n^2\sin^2\theta + 2\sin^4\theta}$$

$$\rho_d = \frac{(n - 1/n)^2 \sin^2\theta}{2 + 2n^2 - (n + 1/n)^2\sin^2\theta + 4\cos\theta\sqrt{n^2 - \sin^2\theta}}$$

(Expressions 3)

Herein, n is a refractive index of a target object. The zenith angle θ can be obtained by substituting the polarization degree ρ obtained by the Expression 2 to either $\rho_s$ or $\rho_d$ in Expressions 3. By the orientation angle α and the zenith angle θ thus obtained, the normal line vector $(p_x, p_y, p_z)$ can be obtained as follows.

[Math. 4]

$$\begin{pmatrix} p_x \\ p_y \\ p_z \end{pmatrix} = \begin{pmatrix} \cos\alpha\cos\theta \\ \sin\alpha\cos\theta \\ \sin\theta \end{pmatrix} \quad \text{(Expression 4)}$$

As described above, from the relation between the intensity I represented by each pixel of the polarization image and the primary axis angle $\theta_{pol}$ of the polarizer, the normal line vector of the target object captured in this pixel can be calculated, and a normal-line vector distribution can be obtained as the whole image. However, as described above, observed light includes a specular reflection component and a diffused reflection component, and therefore, calculation methods of the normal line vector are different from each other. Accordingly, an appropriate model is suitably selected from the specular reflection and the diffused reflection using information regarding the material obtained by the sound absorption coefficient obtaining unit 68.

Figure 6:
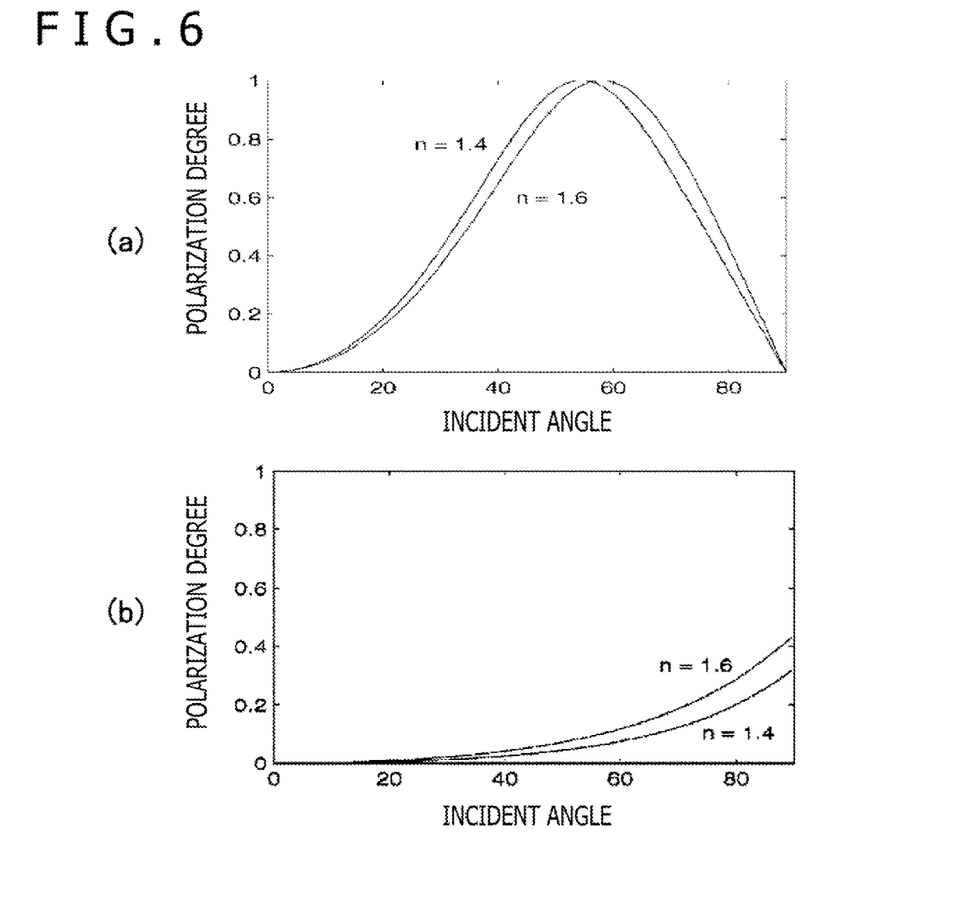
FIG. 6 depicts graphs in which a change in polarization degree with respect to an incident angle is compared between specular reflection light and diffuse reflection light.

Alternatively, a model to be applied may be selected using the polarization degree ρ. In FIG. 6, a change in polarization degree with respect to an incident angle is compared between light subjected to the specular reflection and light subjected to the diffused reflection. Note that the refractive indices n of an object that reflects light are set to be 1.4 and 1.6. The polarization degree of the specularly reflected light illustrated in (a) is remarkably larger than that of the diffusedly reflected light illustrated in (b) in most of the range of the incident angle. In other words, an image of a subject formed of a material in which the specular reflection is dominant has a high possibility of appearance of a high polarization degree. By using this characteristic, for example, a region whose polarization degree p is equal to or larger than a predetermined threshold assumes the specular reflection, and the normal line vector is calculated by applying a corresponding model.

Meanwhile, the sound absorption coefficient obtaining unit 68 may identify the material by solving an inverse problem of a rendering equation that is typically used in computer graphics drawing. In other words, the material of the actual object may be identified in terms of how light from a light source should be reflected to obtain intensity observed as the captured image. In this case, the sound absorption coefficient obtaining unit 68 derives a reflection characteristic at the surface of the actual object on the basis of the positional relation with the actual object and the intensity represented by each pixel in the captured image and identifies the material from which such a reflection characteristic can be obtained.

In the typical computer graphics, an object to which a reflection characteristic is set is disposed and a light source and a camera coordinate system are set in a world coordinate system, whereby an intensity distribution of reflected light from a surface of the object is calculated. At this time, luminance L(r, ω) of light radiated in a direction ω at a point r on the surface of the object is calculated by the following rendering equation.

[Math. 5]

$$L(r,\omega) = L_e(r,\omega) + \int_S f_r(r,\omega,\omega_i) L_i(r,\omega_i)\cos\theta d\omega_i \quad \text{(Expression 5)}$$

Here, $L_e(r, \omega)$ is luminance of light emitted from the object itself at the point r. Indicated by $f_r(r, \omega, \omega_i)$ is a BRDF (Bidirectional Reflection Distribution Function) representing the reflection characteristic of light at the point r, representing a ratio of the luminance L(r, ω) of the reflected light in the direction ω to luminance $L_i(r, \omega_i)$ of the incident light in an incident direction $\omega_i$. This function depends on the material. Further, θ is an angle formed with a direction of the normal line on the surface of the object and the reflection direction ω of light at the point r, and $S_i$ is a range of the incident direction $\omega_i$ of light at the point r. As a result, the luminance L(r, ω), and eventually luminance of an image on the captured image representing the point r, is determined by the normal line at the point r, a positional relation between the light source and the imaging surface, and the material of the object.

By using the relation in Expression 5, when a luminance value of the image represented by the captured image is given to the left side, any of parameters included in the right side can be calculated. This method is called inverse rendering as an inverse problem of graphics drawing. The function $f_r$ is actually a four-dimensional function including orientation angles and the zenith angles of the incident light and the reflected light even when the material of the object is uniform, and therefore, various models are proposed to represent the function in a simple manner (for example, refer to "Inverse rendering: reconstruction of optical information from images," Yoichi Sato, http://www.mtl.t.u-tokyo.ac.jp/~katsu-t/ssii05-ysato.pdf).

In the present exemplary embodiment, a material model in which a material assumed as the actual object and the function $f_r$ or data (reflection characteristic) approximating the function $f_r$ with a predetermined model are associated with each other is created in advance and is stored in the sound absorption coefficient obtaining unit 68. By capturing images of objects formed of various materials in advance, an alternative parameter of the function $f_r$ may be obtained as actual value data of the reflection characteristic for each material. The sound absorption coefficient obtaining unit 68 calculates the reflection characteristic by inversely solving Expression 5 based on information obtained by the normal line obtaining unit 64 and the position obtaining unit 66 and the luminance value of the image on the captured image and refers to the material model by using the reflection characteristic as an index. At this time, the position of the light source may be assumed, or may be estimated from the captured image.

Then, the most suitable material is selected as the material of the actual object serving as an image source. As described above, various models are proposed as a model for simplifying the rendering equation. Therefore, an appropriate model is selected according to, for example, an environment of a space to be captured, which is to be actually assumed, or processing performance of the output control device 10. Note that when a target whose material is to be identified is other than a light emitting body, the first term of the right side in Expression 5 can be omitted.

Further, in a case where the polarization images of four polarization orientations are obtained to obtain the normal line of the actual object in the present exemplary embodiment, those images may be used in the inverse rendering. In other words, as described above, by capturing, in advance, the polarization images of the objects formed of various materials, the actual value data of the reflection characteristic for each material and for each polarization orientation is obtained. Then, using luminance values of four polarization orientations, the reflection characteristic corresponding to each luminance value is calculated from Expression 5, and a material that agrees most with four reflection characteristics is selected.

For example, a material having the closest distance in a four-dimensional space configured with the reflection characteristics is selected. Alternatively, a material is assumed first, and using four reflection characteristics associated with the material, the polarization luminance is obtained for each orientation from Expression 5. Then, a material closest to an actual polarization image may be selected. In any case, by using luminance in four polarization orientations, a material can be obtained more precisely in terms of the ratio of the polarization components.

Alternatively, by applying a model other than the model represented by Expression 5, the material may be estimated based on the similar principle. For example, as the material model, a ratio of the diffused reflection component and the specular reflection component contained in the reflected light is stored while being associated with a material serving as a candidate. As described above, since the spectrum of the reflected light is the linear sum of those reflection components, the ratio of the reflection components of each material candidate is assumed, and then, a change in polarization luminance with respect to an orientation is obtained on the basis of a position of a light source and a position and a posture of the subject and the imaging plane. The obtained result is compared with a change in polarization luminance obtained from Expression 1 by using an actual polarization image, and a material having the smallest difference may be identified as a real material.

Figure 7:
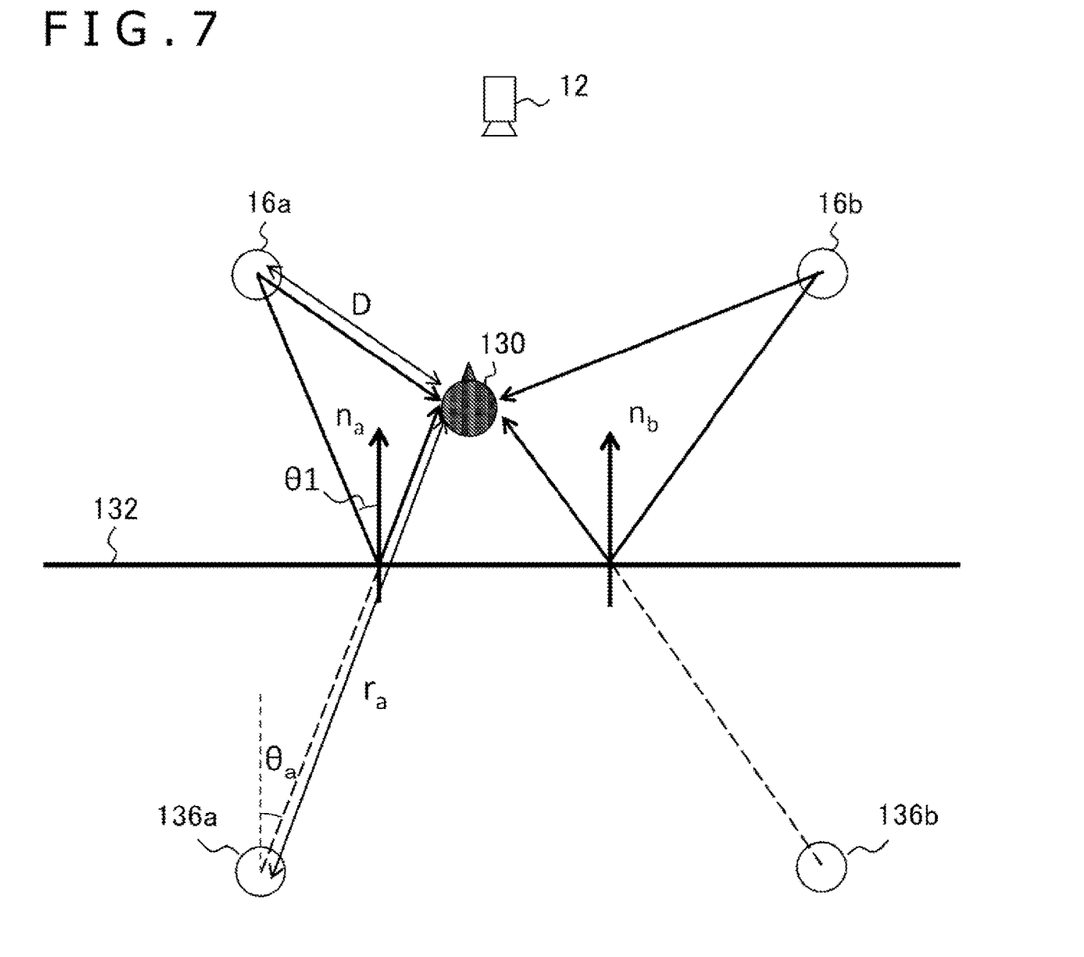
FIG. 7 is a diagram schematically illustrating a sound propagation state in a case where sound from a left speaker and sound from a right speaker are reflected on a uniform surface in the present exemplary embodiment.

Next, an example of a method in which the correction coefficient obtaining unit 56 determines the correction coefficient of the sound signal to be supplied to each of the speakers 16a and 16b will be described. FIG. 7 schematically illustrates a sound propagation state in a case where sound from the left speaker 16a and sound from the right speaker 16b are reflected on a uniform plane. This case is equivalent to a case where a wall 132 having a wide area is present behind the listener 130, for example. FIG. 7 represents such a space with an overhead view. Note that in a case where, even if another wall or actual object is present, it is located far away and therefore, influence of its reflected sound can be neglected, or its sound absorption coefficient is high, the correction coefficient obtaining unit 56 may exclude this reflected sound from reflected sound calculation by, for example, comparing the reflected sound with thresholds to make a determination.

In the illustrated space, the speakers 16a and 16b are disposed in front of the listener 130 on the left and right sides. The imaging device 12 captures an image whose view field includes the listener 130, the speakers 16a and 16b, and the wall 132, to clarify a positional relation between those objects in a three-dimensional space and normal lines $n_a$ and $n_b$ of the wall 132. Note that in a case where positions of the speakers 16a and 16b with respect to the imaging device 12 are clarified in advance, the positional relations between all objects can be determined with a viewing point of the imaging device 12 as a reference, and therefore, only the listener 130 and the wall 132 are required to be imaged. As such a case, a case where the imaging device 12 and the speakers 16a and 16b are fixed with known intervals, or a case where a device integrally provided with those objects is introduced can be cited, for example.

As described above, the reflected sound from the wall 132 also reaches the listener 130, in addition to the direct sound from the speakers 16a and 16b. In other words, in the illustrated example, since the wall 132 generates mirror-image sound sources 136a and 136b, substantially four sound sources are provided. When the number of the sound sources including the mirror-image sound sources is assumed to be N to be generalized while the number of the speakers is not limited, energy R of sound reaching the listener 130 can be represented as follows, by using energy Si (i is a natural number satisfying 1≤i≤N) of each sound ray.

[Math. 6]

$$R = \sum_{i=1}^{N} S_i \quad \text{(Expression 6)}$$

Here, for simplification of the calculation, it is assumed that there is no sound deviation between the speakers 16a and 16b and their mirror-image sound sources 136a and 136b. According to Expression 6, first, it can be understood that the energy of the sound reaching the listener 130 is also significantly changed depending on presence or absence of a reflecting object such as the wall 132. Accordingly, if a case where the wall 132 is located so far away so that its reflected sound can be neglected is assumed as a "reference state," a correction coefficient K in the illustrated state is calculated as follows, for example.

[Math. 7]

$$K = \frac{S_1}{S_1 + S_3} \quad \text{(Expression 7)}$$

or $$K = \frac{S_2}{S_2 + S_4}$$

Here, $S_1$ is the energy of the direct sound from the speaker 16a, $S_2$ is the energy of the direct sound from the speaker 16b, $S_3$ is the energy of the reflected sound of the speaker 16a, and $S_4$ is the energy of the reflected sound of the speaker 16b. When the correction coefficient K is used as a correction coefficient common to the signal levels of the sound output to the speakers 16a and 16b, the sound can be listened with almost the same sound volume as in the reference state even when the wall 132 is present. However, in a case where the speakers output sounds of different channels, the above correction coefficient may change balance of the sound. Accordingly, suitably, a ratio of the change from the reference state is calculated in a speaker unit, whereby the correction coefficient is derived for each speaker. Hereinafter, while assuming the state in FIG. 7 as the "reference state," a case where the correction coefficient for the speaker 16a is calculated will be described.

To calculate the correction coefficient, it is necessary to calculate a damping factor of energy of sound until reaching the listener 130 for each of the direct sound and the reflected sound. The damping factor of energy is proportional to a distance from the sound source. In addition, in the reflected sound, the damping factor is further proportional to a sound absorption coefficient at a reflection surface. In the state in FIG. 7, when a distance from the speaker 16a to the listener 130 is D and an incident angel of the reflected sound reaching the listener 130 is θ1 at the wall 132, a distance $r_a$ from the mirror-image sound source 136a to the listener 130 can be approximated as follows.

$$r_a \approx D/\sin(\theta 1)$$

Figure 8:
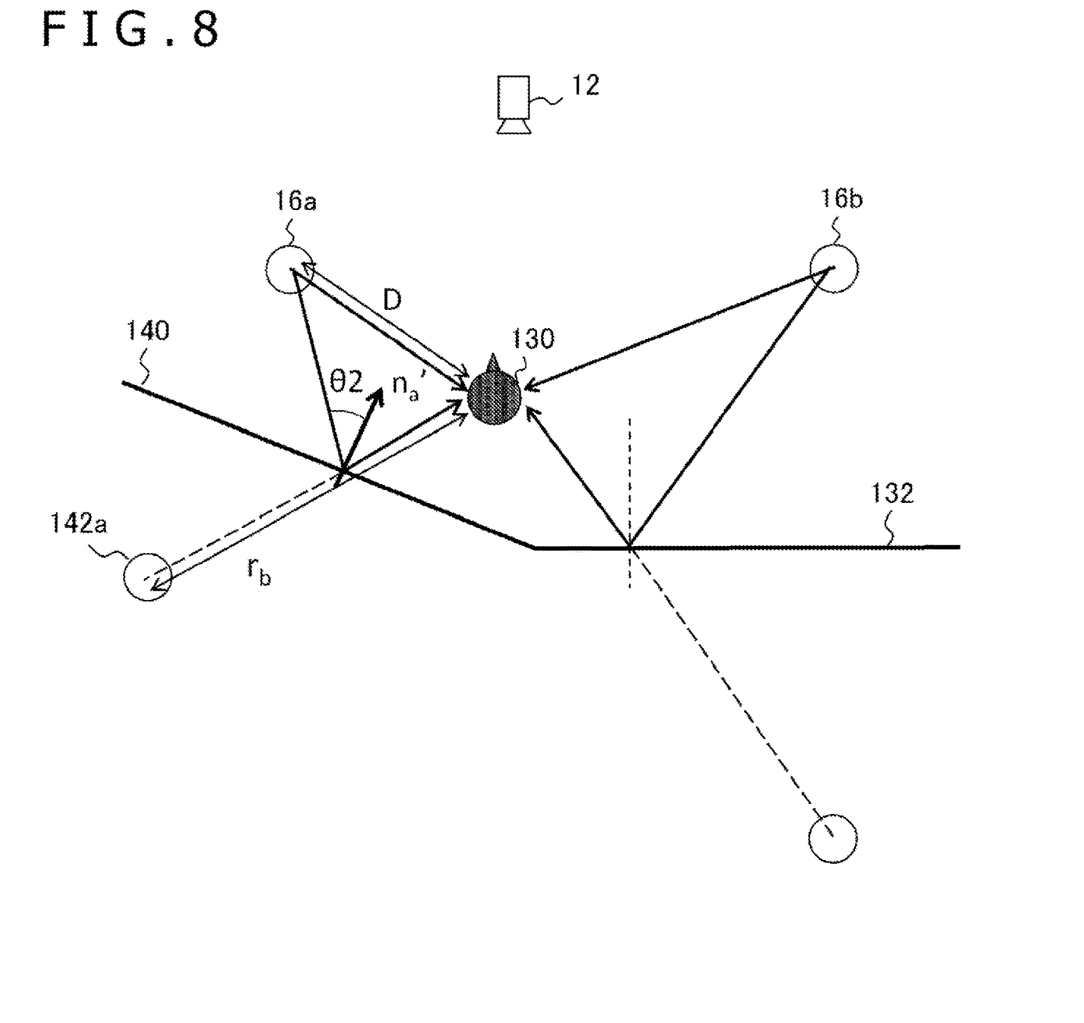
FIG. 8 is a diagram schematically illustrating the sound propagation state in a case where inclination of a reflection surface is changed from a state in FIG. 7.

FIG. 8 schematically illustrates a sound propagation state in a case where inclination of the reflection surface changes from the state in FIG. 7. This case is equivalent to a case where furniture is diagonally disposed in front of the wall 132, for example. In this example, a new reflection surface 140 whose angle with a line connecting the speaker 16a and the listener 130 is smaller is formed, and therefore, an incident angle θ2 of the reflected sound is larger than the incident angle θ1 in the state in FIG. 7. As a result, even when the positional relation between the speaker 16a and the listener 130 is the same, a distance $r_b$ from the mirror-image sound source 142a to the listener 130 is shorter than $r_a$ as follows.

$$r_b \approx D/\sin(\theta 2) < r_a$$

In contrast, when the incident angle is made smaller, the distance from the mirror-image sound source to the listener 130 is made longer.

As described above, the damping factor of energy of sound is proportional to the distance from the sound source. Accordingly, in the case in FIG. 8, the sound from the speaker 16a is listened larger than in the case in FIG. 7.

Further, the damping factor is also proportional to the sound absorption coefficient at the reflection surface 140. In other words, when the energy at the sound source is A, the distance from the mirror-image sound source to the listener 130 is r, the sound absorption coefficient at the reflection surface is α, and the incident angle at the reflection surface is θ, energy $S_r$ of the reflected sound can be represented as follows.

[Math. 8]

$$S_r = \frac{A(1-\alpha)}{r} = \frac{A\sin\theta \cdot (1-\alpha)}{D} \quad \text{(Expression 8)}$$

On the other hand, since the direct sound $S_d$ from the speaker 16a=A/D is satisfied, energy $S_{total}$ of sound reaching the listener 130 including the reflected sound becomes as follows.

[Math. 9]

$$S_{total} = \frac{A}{D}(1 + \sin\theta \cdot (1-\alpha)) \quad \text{(Expression 9)}$$

Note that, strictly speaking, the reflection coefficient α depends on the incident angle θ of the reflected sound. Accordingly, when this characteristic is prepared as a function from a material of the reflection surface, α may be derived rigorously based on the incident angle θ. In any case, in the present exemplary embodiment, since the positional relation between the normal line of the actual object and the speakers as well as the listener is clarified, the incident angle θ of the reflected sound can be known. As a result, the energy of the sound reaching the listener can be calculated as a ratio to the energy A at the sound source.

With the state in FIG. 7 as the reference state, the correction coefficient K of the speaker 16a in the state in FIG. 8 can be calculated as follows.

[Math. 10]

$$K = \frac{S_1}{S_2} = \frac{1 + \sin(\theta 1) \cdot (1-\alpha)}{1 + \sin(\theta 2) \cdot (1-\alpha)} \quad \text{(Expression 10)}$$

When the same calculation is also performed for the speaker 16b, the correction coefficient is calculated for each speaker. Note that, although one reflection surface is used in the examples in FIGS. 7 and 8, even when two or more reflection surfaces are used, when energy of every reflected sound is calculated using Expression 8, the energy of sound reaching the listener can similarly be calculated, and eventually, the correction coefficients K can easily be derived.

The illustrated example is used in a relatively small space. However, the correction coefficients can be calculated with the similar calculation also in a concert hall, for example. In this case, for example, it can be considered that the energy of the reflected sound is calculated assuming whole spectators as a mass, or a listening point is set at a center of spectator seats. Alternatively, the spectator seats and speakers are partitioned into a plurality of areas, one listening point is disposed for each area, and the illustrated calculation may be performed for each area.

Figure 9:
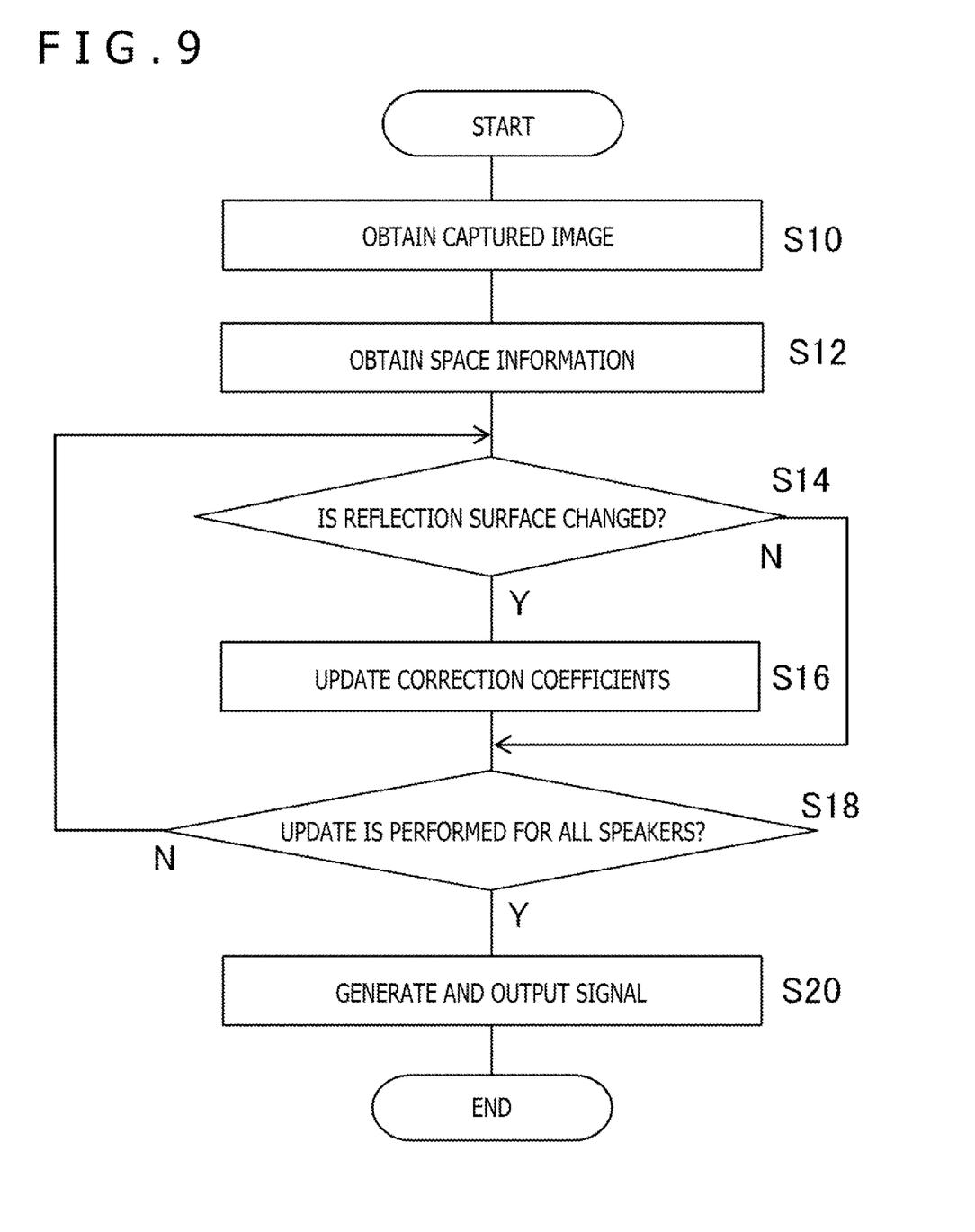
FIG. 9 is a flowchart illustrating a processing procedure in which the output control device of the present exemplary embodiment controls sound according to a state of an actual object.

Next, an operation of the output control device achievable with the configuration that has been described will be described. FIG. 9 is a flowchart illustrating a processing procedure in which the output control device 10 in the present exemplary embodiment controls sound according to the state of the actual object. This flowchart is started after the imaging device 12 captures an image of the listening space or during a period in which the imaging device 12 captures an image at a predetermined rate. Typically, as described above, the listener is also present in the space to be captured, and therefore sound reaching the location where the listener is present is calculated and is used for adjustment. However, depending on a case, the listening point may virtually be set in a space with no listener.

Further, data of the position and the posture of the actual object in the "reference state" that does not correct the sound or that uses a default value as the correction coefficient is stored in the correction coefficient obtaining unit 56. For example, a case where only the direct sound reaches the listener is defined as the reference state, and the correction coefficient is set to one. Alternatively, the state of the actual space at the start of use of the output control device 10 is defined as the reference state, and the default value of the correction coefficient is derived. Those correction coefficients are recorded as initial values of the correction coefficients 62 in the output unit 60.

Then, the captured image obtaining unit 50 obtains captured image data such as the polarization images of the plurality of orientations from the imaging device 12 (S10). Next, the space information obtaining unit 54 obtains the positions of the actual objects such as the furniture and the listener and the normal line vector and the sound absorption coefficient of each surface as described above by using the captured images (S12). In a case where the listener is not taken into account as the reflection surface, obtainment of the normal line and the sound absorption coefficient of the listener can be omitted. Further, the positions of the speakers 16a and 16b may similarly be obtained from the captured images, or the positional relation between the speakers 16a and 16b and the imaging device 12 may be obtained in advance.

Subsequently, the correction coefficient obtaining unit 56 checks whether or not the reflection surface is changed from the "reference state" (S14). In a case where a state where the reflection surface is not present is set to be the reference state, the correction coefficient obtaining unit 56 detects appearance of the reflection surface as the change. In a case where the reference state includes the reflection surface, the correction coefficient obtaining unit 56 detects a change in a position or a posture of this reflection surface or appearance of another reflection surface, as the change. In a case where the reflection surface is changed (Y in S14), the correction coefficient obtaining unit 56 calculates the energy of sound reaching the listener while taking sound reflected at the changed reflection surface into account, and updates the correction coefficients 62 (S16).

When the reflection surface is not changed, the correction coefficients are left unchanged (N in S14). The check in S14 is performed for all speakers 16a and 16b, and the correction coefficient is updated for each speaker as necessary (N in S18, S14, S16). As in the example illustrated in FIG. 8, even when the new reflection surface 140 appears in a space, there is a case where influence of the sound from the speaker 160b present far away from the new reflection surface 140 can be neglected. Accordingly, the check in S14 is performed while taking into account a range where such influence reaches. Therefore, the distance from the speaker is compared with a threshold, for example, and only the change of the reflection surface within the range is detected.

When the correction coefficient update is performed for all speakers as necessary (Y in S18), the output unit 60 reproduces the sound signals and adjusts the signal levels by using the set correction coefficients 62, to output the sound signals to the speakers 16a and 16b (S20). The processes from S10 to S18 may be performed only once as the initial process, and in a case where the sound is generated at another timing, only the process in S20 may be performed. Alternatively, the processes from S10 to S18 may be performed at a predetermined rate, whereby the correction coefficients may be adjusted so as to appropriately correspond to the change in the space even during the middle of the music or the moving image, for example.

According to the present exemplary embodiment described above, a device that controls sound from a speaker obtains a position and a normal line of an actual object near the speaker and adjusts a sound signal while taking sound reflected at the actual object into account. In other words, the device calculates, from a configuration of the space, a change of a listening state due to a change in an actual space from a reference state and corrects a signal level so as to suppress the change. Here, the reference state is a state assumed in optimization of a sound field, for example. With this configuration, an optimal listening environment with high robustness can be provided without spending labor of, for example, analyzing and measuring sound actually measured by a microphone.

Further, from a geometric viewpoint of the actual space, calculation of correctly separating sound for each speaker can be performed, whereby a correction coefficient can be set for each speaker. As a result, regardless of the number of speakers, advanced adjustment in which each speaker is independently controlled and balance as a whole is optimized can be achieved highly efficiently. Further, the position and the normal line of the actual object are calculated using captured images of, for example, a polarized light camera. With this configuration, even when the actual object moves or its posture is changed upon operation, the changed state can be immediately reflected on sound adjustment.

Further, by using the polarization images, the normal line and a material of the actual object can be estimated, whereby correct adjustment taking into consideration a sound absorption coefficient can efficiently be performed. Further, information regarding an incident angle of the reflected sound to be derived can also be used for precise identification of the sound absorption coefficient. This can efficiently improve accuracy of the adjustment.

As described above, the present invention has been described based on the exemplary embodiment. Persons skilled in the art understand that the above exemplary embodiment is illustrative, various modifications are possible in a combination of the components and the processing processes, and such modifications are also included in the scope of the present invention.

For example, in the present exemplary embodiment, a case where the control target is sound is mainly described, but this technique can similarly be applied to a substance such as air, light, smoke, smell, or liquid, which propagates in a space and whose propagation direction and strength are changed depending on presence of an actual object or a change in posture of the actual object in the space as described above. In other words, by capturing an image of the space, a position and the posture of the actual object are recognized, and influence of reflection at the actual object is calculated, whereby energy, a supply amount, and the like at a supply source of the substance are adjusted. Alternatively, when the substance is to be discharged to the outside of the space, a suction amount upon discharging may be adjusted. In those aspects, only influence at a local place as the listener may be calculated and adjusted, or adjustment based on a distribution may be performed such that influence is calculated and equalized at a plurality of places dispersed in the space.

With this configuration, for example, states of the substances optimized at a design stage of a room or equipment can easily be maintained regardless of a change in situation such as an increase or decrease in a size of a space, furniture, or persons. Further, in the present exemplary embodiment, in order to immediately optimize the signal level, the propagation of sound energy is calculated with a relatively simple model, but precise calculation with, for example, a fluid model may be performed depending on a case. Alternatively, precise calculation may be performed in advance on a plurality of patterns of the positions and the postures of the actual objects to be assumed, and the correction coefficients may be obtained by referring to a calculation result close to an actual situation obtained from the captured image upon operation.

In the present exemplary embodiment, since the normal line and the position of the actual object can accurately be obtained, when the present exemplary embodiment is applied to a technique in which sound from a directional speaker is reflected and listened, which is, for example, described in PTL 1, an optimal reflection position can be calculated more accurately. In this case, instead of adjustment of the signal level, a direction of the directional speaker is adjusted.

REFERENCE SIGNS LIST

8 Object, 10 Information processing device, 12 Imaging device, 16a Speaker, 23 CPU, 24 GPU, 26 Main memory, 42 Sound processor, 50 Captured image obtaining unit, 54 Space information obtaining unit, 56 Correction coefficient obtaining unit, 58 Sound data storage, 60 Output unit, 62 Correction coefficient, 64 Normal line obtaining unit, 66 Position obtaining unit, 68 Sound absorption coefficient obtaining unit

INDUSTRIAL APPLICABILITY

As described above, the present invention can be used for various output control devices such as a sound control device, an audio device, a content reproducing device, an air conditioner, and an illumination control device, a system including any of those devices, and the like.

The invention claimed is:

1. An output control device that controls output of sound, comprising: a space information obtaining unit that obtains a position and a normal line of an actual object in a space on a basis of a captured image; a correction coefficient obtaining unit that calculates a ratio of a change of a parameter representing a state of the sound at a predetermined position, the change being caused by reflection at the actual object, on a basis of the position and the normal line, and obtains a correction coefficient for adjusting the output of the sound, on a basis of the ratio of the change; and an output unit that adjusts the output of the sound by using the correction coefficient.

2. The output control device according to claim 1, wherein the correction coefficient obtaining unit obtains the correction coefficient for a level of a sound signal by calculating the ratio of the change of energy of the sound at a position of a listener, and the output unit outputs the sound signal whose level is adjusted using the correction coefficient to a speaker.

3. The output control device according to claim 2, wherein the correction coefficient obtaining unit obtains the correction coefficient for each of a plurality of the speakers, and the output unit adjusts the level of the sound signal for each of the speakers to output the level of the sound signal.

4. The output control device according to claim 2, wherein the correction coefficient obtaining unit obtains, on a basis of the ratio of the change of the energy caused by reflection of the sound from one of a plurality of the speakers, the correction coefficient for the level of the sound signal of the one of the plurality of the speakers.

5. The output control device according to claim 2, wherein the correction coefficient obtaining unit obtains, on a basis of the ratio of the change of the energy caused by reflection of the sound from one of a plurality of the speakers, the correction coefficient for the level of the sound signal of another one of the plurality of the speakers.

6. The output control device according to claim 1, wherein the space information obtaining unit obtains the normal line of the actual object on a basis of polarization images of a plurality of orientations.

7. The output control device according to claim 1, wherein the space information obtaining unit further obtains a material of the actual object on a basis of the captured image or a user input, and the correction coefficient obtaining unit includes influence of the material in the reflection at the actual object into calculation of the ratio of the change of the parameter.

8. The output control device according to claim 6, wherein the space information obtaining unit further obtains a sound absorption coefficient by estimating a material of the actual object on the basis of the polarization images, and the correction coefficient obtaining unit calculates the energy of reflected sound on a basis of a path length of the sound and the sound absorption coefficient at the actual object.

9. The output control device according to claim 8, wherein the correction coefficient obtaining unit obtains the sound absorption coefficient at the actual object on a basis of an incident angle of the sound at the actual object calculated from the position and the normal line.

10. An output control system comprising: an imaging device that captures an image of a space; and an output control device that controls output of sound, wherein the output control device includes a space information obtaining unit that obtains a position and a normal line of an actual object in the space on a basis of an image captured by the imaging device, a correction coefficient obtaining unit that calculates a ratio of a change of a parameter representing a state of the sound at a predetermined position, the change being caused by reflection at the actual object, on a basis of the position and the normal line, and obtains a correction coefficient for adjusting output of the sound, on a basis of the ratio of the change, and an output unit that adjusts the output of the sound by using the correction coefficient.

11. An output control method comprising: by an output control device that controls output of sound obtaining a captured image of a space by an imaging device; obtaining a position and a normal line of an actual object in the space on a bask of the captured image; calculating a ratio of a change of a parameter representing a state of the sound at a predetermined position, the change being caused by reflection at the actual object, on a bask of the position and the normal line, and obtaining a correction coefficient for adjusting the output of the sound, on a basis of the ratio of the change; and adjusting the output of the sound by using the correction coefficient.

12. A non-transitory computer readable medium having stored thereon a computer program for a computer that controls output of sound, comprising: by a space information obtaining unit, obtaining a position and a normal line of an actual object in a space on a basis of a captured image; by a correction coefficient obtaining unit, calculating a ratio of a change of a parameter representing a state of the sound at a predetermined position, the change being caused by reflection at the actual object, on a basis of the position and the normal line, and obtaining a correction coefficient for adjusting the output of the sound, on a bask of the ratio of the change; and by an output unit, adjusting the output of the sound by using the correction coefficient.

13. An output control device that controls output of a propagation substance that propagates in a space, the output control device comprising: a space information obtaining unit that obtains a position and a normal line of an actual object in the space on a basis of a captured image; a correction coefficient obtaining unit that calculates a ratio of a change of a parameter representing a state of the propagation substance at a predetermined position, the change being caused by reflection at the actual object, on a basis of the position and the normal line, and obtains a correction coefficient for adjusting the output of the propagation substance, on a basis of the ratio of the change; and an output unit that adjusts the output of the propagation substance by using the correction coefficient.

* * * * *